United States Patent [19]

Calundann et al.

[11] 4,371,660

[45] Feb. 1, 1983

[54] ANISOTROPIC MELT PHASE FORMING POLY(ESTER-CARBONATE) DERIVED FROM 6-HYDROXY-2-NAPTHOIC ACID, AROMATIC DIOL, ORGANIC COMPOUND CAPABLE OF FORMING A CARBONATE LINKAGE, AND, OPTIONALLY, OTHER AROMATIC HYDROXY-ACID AND CARBOCYCLIC DICARBOXYLIC ACID

[75] Inventors: Gordon W. Calundann, North Plainfield; Anthony J. East, Madison, both of N.J.

[73] Assignee: Celanese Corporation, New York, N.Y.

[21] Appl. No.: 319,024

[22] Filed: Nov. 6, 1981

[51] Int. Cl.$^3$ ............................................. C08G 63/64
[52] U.S. Cl. ..................... 524/601; 524/603; 524/604; 524/605; 528/190
[58] Field of Search ............... 524/601, 603–605; 528/190–194, 176, 370–372

[56] References Cited

U.S. PATENT DOCUMENTS 4,284,757  8/1981  Fayolle ............................... 528/191
4,310,652  1/1982  DeBona et al. ..................... 528/190
4,330,457  5/1982  East et al. .......................... 528/190

*Primary Examiner*—Lester L. Lee
*Attorney, Agent, or Firm*—Burns, Doane, Swecker & Mathis

[57] ABSTRACT

A melt processable poly(ester-carbonate) which is capable of forming an anisotropic melt phase is provided. The poly(ester-carbonate) of the present invention consists essentially of the recurring units (a) 6-oxy-2-naphthoyl moiety, (b) dioxyaryl moiety, (c) carbonyl moiety (i.e., carbonate moiety), and, optionally, (d) other aromatic moiety derived from aromatic hydroxyacid and (e) carbocyclic dicarboxyl moiety in the proportions indicated. Preferably, the dioxyaryl moiety is derived from hydroquinone, the carbonic acid moiety which is derived from a diarylcarbonate (e.g., diphenyl carbonate), and the additional aromatic moiety which is derived from an aromatic hydroxyacid is derived from hydroxybenzoic acid. The resulting poly(ester-carbonate) exhibits a melting temperature below approximately 400° C., preferably below approximately 350° C. The poly(ester-carbonate) of the present invention is preferably formed by a melt polymerization technique.

43 Claims, No Drawings

ANISOTROPIC MELT PHASE FORMING POLY(ESTER-CARBONATE) DERIVED FROM 6-HYDROXY-2-NAPTHOIC ACID, AROMATIC DIOL, ORGANIC COMPOUND CAPABLE OF FORMING A CARBONATE LINKAGE, AND, OPTIONALLY, OTHER AROMATIC HYDROXY-ACID AND CARBOCYCLIC DICARBOXYLIC ACID

BACKGROUND OF THE INVENTION

The use of objects molded from synthetic polymers has expanded rapidly in the last several decades. In particular, polyesters have widely gained acceptance for general molding applications and in the formation of fibers and films. An additional class of polymers known as the poly(ester-carbonates) has been disclosed.

For example, U.S. Pat. No. 3,169,121 discloses a class of resins comprising both carbonate and carboxylate groups in the linear chain. The resins are prepared by reacting a difunctional carboxylic acid, a dihydric phenol, and a carbonate precursor. However, the reference does not disclose the inclusion of a moiety derived from an aromatic hydroxyacid, nor does the reference disclose the preparation of a poly(ester-carbonate) which exhibits an anisotropic melt phase.

U.S. Pat. No. 4,260,731 discloses an aromatic poly(ester-polycarbonate) resin derived from a dihydroxydiaryl compound, a mixture of a terephthaloyl chloride and an isophthaloyl chloride, and phosgene. The reference does not disclose the inclusion of a moiety derived from an aromatic hydroxyacid, nor does the reference disclose or suggest the existence or the desirability of an anisotropic melt phase.

Additional disclosures of poly(ester-carbonate) include U.S. Pat. Nos. 3,053,810, 3,220,976, and 3,409,704.

Although many polyesters and poly(ester-carbonate) have mechanical properties suitable for general applications, most polyesters and poly(ester-carbonate) are not suitable for high strength service because the mechanical properties are not sufficiently high. One group of polymers that is suitable for high strength service without the use of a reinforcing agent is a new class of polymers exhibiting a general overall balance of mechanical properties substantially enhanced over previous polymers. These polymers have been described by various terms, including "liquid crystalline," "liquid crystal," "thermotropic," "mesogenic," and "anisotropic." Briefly, the polymers of this new class are thought to involve a parallel ordering of the molecular chains. The state wherein the molecules are so ordered is often referred to either as the liquid crystal state or the nematic phase of the liquid crystal state. These polymers are prepared from monomers which are generally long, flat, and fairly rigid along the long axis of the molecule and commonly have chain extending linkages that are either coaxial or parallel.

Disclosures of polyesters which exhibit melt anisotropy include (a) *Polyester X7G-A Self-Reinforced Thermoplastic*, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1 to 4, (b) Belgian Pat. Nos. 828,935 and 828,936, (c) Dutch Pat. No. 7505551, (d) West German Pat. Nos. 2520819, 2520820, 2722120, 2834535, 2834536, and 2834537, (e) Japanese Nos. 43-223; 2132-116; 3017-692; and 3021-293, (f) U.S. Pat. Nos. 3,991,013; 3,991,014; 4,057,597; 4,066,620; 4,067,852; 4,075,262; 4,083,829; 4,093,595; 4,118,372; 4,130,545; 4,130,702; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,228,218; 4,230,817; 4,232,143; 4,232,144; 4,238,598; 4,238,599; 4,238,600; 4,242,496; 4,245,082; 4,245,084; 4,247,514; 4,256,624; 4,265,802; 4,267,304; 269,965; 4,279,803; and 4,285,852; and (g) U.K. Application Nos. 2,002,404; 2,008,598A; and 2,030,158A. See also commonly assigned U.S. Ser. Nos. 91,003, filed Nov. 5, 1979 (now U.S. Pat. No. 4,337,191); 128,759, filed Mar. 10, 1980 (now U.S. Pat. No. 4,299,756); and 169,014, filed July 15, 1980 (now U.S. Pat. No. 4,337,190).

U.S. Pat. No. 4,107,143 discloses a substantially linear aromatic poly(ester-carbonate) consisting essentially of hydroxybenzoic acid unit, hydroquinone unit, and carbonate unit as well as, depending upon the circumstances, aromatic carboxylic acid unit. It is disclosed that the aromatic poly(ester-carbonate) exhibits melt anisotropy. However, the reference does not disclose the inclusion of a 6-oxy-2-naphthoyl moiety, as is required by the presently claimed invention.

Also, British Pat. No. 1,568,541 discloses an aromatic poly(ester-carbonate) which exhibits an anisotropic melt phase, but which lacks 6-oxy-2-naphthoyl moiety.

Other disclosures of poly(ester-carbonate) exhibiting an anisotropic melt phase include European Patent Application No. 8042001.0 (Publication No. 15856) and Japanese Patent Application No. 55129-420.

It is an object of the present invention to provide an improved poly(ester-carbonate) which is suited for the formation of quality molded articles, melt extruded fibers, and melt extruded films.

It is also an object of the present invention to provide an improved poly(ester-carbonate) which forms a highly tractable melt phase.

It is also an object of the present invention to provide an improved poly(ester-carbonate) which forms an anisotropic melt phase at a temperature well below its decomposition temperature and which may form quality fibers, films, and molded articles.

It is also an object of the present invention to provide an improved melt-processable poly(ester-carbonate) capable of forming an anisotropic melt phase at a temperature below approximately 400° C., and preferably below approximately 350° C.

It is also an object of the present invention to provide an improved melt-processable poly(ester-carbonate) which exhibits a highly advantageous combination of properties, including the ability to form an anisotropic melt phase, excellent tractability in the melt, and thermal stability.

It is a further object of the present invention to provide an improved melt-processable poly(ester-carbonate) which is capable of forming shaped articles which exhibit improved stiffness.

These and other objects, as well as the scope, nature and utilization of the present invention, will be apparent to those skilled in the art from the following detailed description.

SUMMARY OF THE INVENTION

A melt-processable poly(ester-carbonate) capable of forming an anisotropic melt phase at a temperature below approximately 400° C. is provided. The poly(ester-carbonate) consists essentially of recurring moieties I, II, III, and, optionally, IV and V wherein:

I is

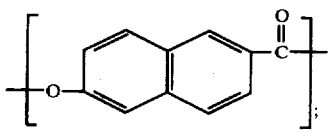

II is

O—Ar—O, where Ar is a divalent radical comprising at least one aromatic ring;

III is

IV is

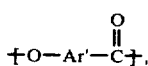

where Ar' is a divalent radical comprising at least one aromatic ring, other than 2,6-naphthylene; and V is

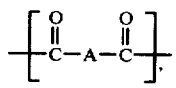

where A is a divalent carbocyclic radical, wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein moiety I is present in the polymer in a concentration of at least approximately 20 mole percent, moiety IV is present in the polymer in a concentration within the range of approximately 0 to 60 mole percent, with the total molar concentration of moieties I and IV in the polymer being within the range of approximately 20 to 80 mole percent, moiety II is present in the polymer in a concentration within the range of approximately 10 to 40 mole percent, moiety III is present in the polymer in a concentration within the range of approximately 10 to 40 mole percent, and moiety V is present in the polymer in a concentration within the range of approximately 0 to 30 mole percent, with the molar concentration of moiety II being substantially equal to the sum of the molar concentrations of moieties III and V.

DESCRIPTION OF THE PREFERRED EMBODIMENTS

The poly(ester-carbonate) of the present invention includes at least three recurring moieties which when combined in the poly(ester-carbonate) have been found to form an atypical, optically anisotropic melt phase. The polymer forms an anisotropic melt phase at a temperature below approximately 400° C. (e.g., below approximately 350° C.). The polymer melting temperatures may be confirmed by the use of a differential scanning calorimeter (i.e., DSC) employing repeat scans at a 20° C. per minute heat-up rate and by observing the peak of the DSC melt transition. The poly(ester-carbonate) commonly exhibits a melting temperature of at least approximately 200° C. and preferably of at least approximately 250° C. as determined by differential scanning calorimetry. The poly(ester-carbonate) of the present invention may exhibit more than one DSC transition temperature.

Because of its ability to exhibit anisotropic properties (i.e., liquid crystalline properties) in the melt, the poly(ester-carbonate) readily can form a product having a highly oriented molecular structure upon melt-processing. Preferred poly(ester-carbonate) compositions are capable of undergoing melt processing at a temperature within the range of approximately 250° C. to 350° C., as discussed more fully hereinafter.

The poly(ester-carbonate) includes three essential moieties. Moiety I can be termed a 6-oxy-2- naphthoyl moiety and possesses the structural formula:

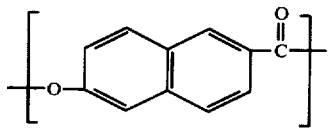

While not specifically illustrated in the structural formula, at least some of the hydrogen atoms present upon the aromatic rings of moiety I may be substituted. Representative ring substituted compounds from which moiety I can be derived include: 6-hydroxy-5-chloro-2-naphthoic acid, 6-hydroxy-5-methyl-2-naphthoic acid, 6-hydroxy-5-methoxy-2-naphthoic acid, 6-hydroxy-7-chloro-2-naphthoic acid, 6-hydroxy-5,7-dichloro-2-naphthoic acid, etc. The presence of ring substitution tends to modify to some degree the physical properties of the resulting polymer (e.g., the polymer may soften at a lower temperature, its impact strength may be improved, and the crystallinity of the solid polymer may be decreased). In a preferred embodiment wherein a poly(ester-carbonate) of optimum crystallinity in the solid state is desired, no ring substitution is present.

As will be apparent to those skilled in the art, moiety I can be derived from unsubstituted 6-hydroxy-1-naphthoic acid and the derivatives thereof. A convenient laboratory preparation for forming 6-hydroxy-2-naphthoic acid is described in Berichte, Vol. 58, 2835–45 (1925) by K. Fries and K. Schimmelschmidt which is herein incorporated by reference. Also, U.S. Pat. No. 1,593,816 is concerned with a process for synthesizing 6-hydroxy-2-naphthoic acid by reacting carbon dioxide with the potassium salt of beta-naphthol.

Moiety I is present in the poly(ester-carbonate) of the present invention in a concentration of at least 20 mole percent up to approximately 80 mole percent. Preferably, moiety I is present in a concentration within the range of approximately 20 to 70 mole percent. More preferably, moiety I is present in the polymer in a concentration within the range of approximately 30 to 60 mole percent.

The second essential moiety (i.e., moiety II) can be termed a dioxyaryl moiety and has the formula O—Ar—O, where Ar is a divalent radical comprising at least one aromatic ring. Preferably, moiety II is symmetrical. By "symmetrical," it is meant that the divalent bonds which join the moiety to other moieties in the main polymer chain are symmetrically disposed on one or more rings (e.g., are para to each other or diagonally disposed when present on a condensed ring system). Preferred moieties which may serve as a symmetrical dioxyaryl moiety in the poly(ester-carbonate) of the present invention include:

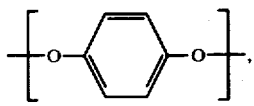

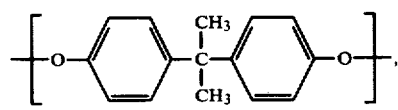

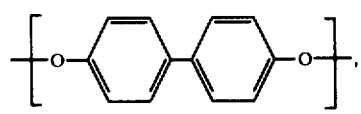

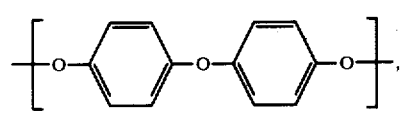

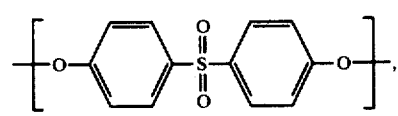

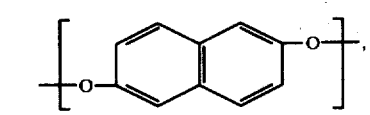

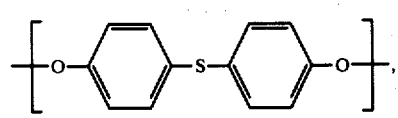

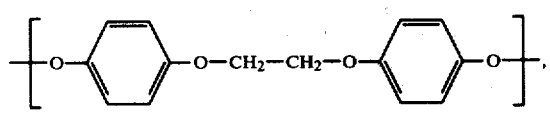

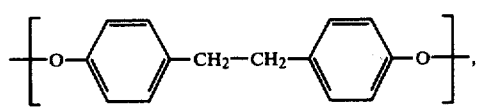

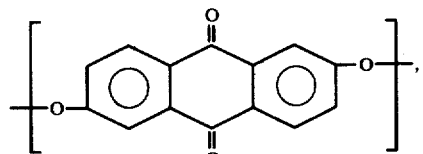

and mixtures of the foregoing. Highly satisfactory polymers can be formed wherein the dioxyaryl moiety is free of ring substitution.

A particularly preferred dioxyaryl moiety is:

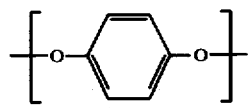

which readily may be derived fom hydroquinone. Representative examples of ring substituted compounds from which moiety II can be derived include methylhydroquinone, chlorohydroquinone, bromohydroquinone, phenylhydroquinone, etc. An example of a non-symmetrical dioxyaryl moiety is that derived from resorcinol.

Moiety II is present in the poly(ester-carbonate) of the present invention in a concentration within the range of approximately 10 to 40 mole percent. Preferably, moiety II is present in a concentration within the range of approximately 15 to 35 mole percent (e.g., approximately 20 to 30 mole percent).

The third essential moiety (i.e., moiety III) is a carbonyl moiety represented by the formula

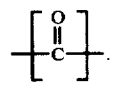

This moiety can be derived from any precursor of carbonic acid which is capable of reacting to form carbonate units. Examples of such compounds are diaryl carbonates, phosgene, diarylbischloroformates, etc.

Moiety III is preferably derived from a diaryl carbonate. Suitable diaryl carbonates include diphenyl carbonate, dicresyl carbonate, phenyl cresyl carbonate, dinaphthyl carbonate, dixylyl carbonate, di(nitrophenyl)carbonate, di(chlorophenyl)carbonate, etc. Diphenyl carbonate is the most preferred of the diaryl carbonates, since it is the easiest and most convenient to use. While phosgene is inexpensive, it is more difficult to handle as will be apparent to those skilled in the art.

Moiety III is present in the poly(ester-carbonate) of the present invention in a concentration within the range of approximately 10 to 40 mole percent. Preferably, moiety III is present in a concentration within the range of approximately 15 to 35 mole percent (e.g., 20 to 30 mole percent).

In addition to the three essential moieties described above, the poly(ester-carbonate) may further include additional optional moieties (moieties IV and V).

Moiety IV is derived from an aromatic hydroxyacid other than 6-hydroxy-2-naphthoic acid or derivatives thereof. Moiety IV has the structural formula

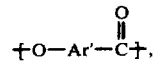

where Ar' is a divalent radical comprising at least one aromatic ring, other than 2,6-naphthylene. Moiety IV is preferably derived fom a symmetrical aromatic hydroxyacid, the term "symmetrical" having the same meaning as described above.

The preferred moiety which may serve as a symmetrical aromatic moiety derived from a hydroxyacid is a p-oxybenzoyl moiety. Other aromatic hydroxyacids from which moiety II may be derived include 3-hydroxybenzoic acid; 7-hydroxy-2-naphthoic acid; 4-hydroxy-4'-carboxybiphenyl; 4-hydroxy-4'-carboxydiphenyl ether; 3-chloro-4-hydroxybenzoic acid; 3,5-dichloro-4-hydroxy-benzoic acid; 3-methyl-4-hydroxybenzoic acid; 3,5-dimethyl-4-hydroxybenzoic acid; 3-methoxy-4-hydroxybenzoic acid; 3,5-dimethoxy-4-hydroxybenzoic acid; etc.

Although moiety IV may be substituted in the same manner as moiety I, highly satisfactory polymers can be formed wherein moiety IV is free of ring substitution.

Moiety IV is present in the poly(ester-carbonate) of the present invention in a concentration within the range of approximately 0 to 60 mole percent. Preferably, moiety IV is present in a concentration within the range of approximately 0 to 30 mole percent (e.g., approximately 5 to 30 mole percent).

The total molar concentration of moieties I and IV is within the range of approximately 20 to 80 mole percent. Preferably, the total molar concentration of moieties I and IV is within the range of approximately 20 to 70 mole percent (e.g., approximately 20 to 60 mole percent).

Moiety V is carbocyclic dicarboxyl moiety of the formula

where A is a divalent carbocyclic radical. Preferably, the A radical comprises at least one aromatic ring or at least one divalent *trans*-1,4-cyclohexylene radical. Moiety V is more preferably a dicarboxyaryl moiety, and, even more preferably, a symmetrical dicarboxyaryl moiety, as described above.

Suitable divalent carbocyclic radicals include paraphenylene; 4,4'-biphenylene; 1,2-ethylenebis(4-oxyphenyl); 2,6-naphthylene; metaphenylene; 2,7-naphthylene; *trans*-1,4-cyclohexylene; 4,4'-methylenebis(cyclohexyl); etc.

A preferred moiety which may serve as a symmetrical dicarboxyaryl moiety in the poly(ester-carbonate) of the present invention is a terephthaloyl moiety. An example of a non-symmetrical dicarboxylaryl moiety is an isophthaloyl moiety. Preferably, moiety V is derived from a member of the group consisting of terephthalic acid, isophthalic acid, 2,6-naphthalenedicarboxylic acid, *trans*-1,4-cyclohexanedicarboxylic acid, and mixtures thereof.

In the case where A comprises at least one divalent cyclohexylene radical, it has been found that only cyclohexylene radicals in the *trans* configuration give rise to a poly(ester-carbonate) which exhibits anisotropy in the melt phase. This is believed to be due to the disruption and destruction of the rodlike nature of the polymer molecules by the presence of cyclohexylene radicals in the *cis* configuration. However, a relatively small amount of cyclohexylene radicals in the *cis* configuration, as compared with the total amount of polymer, can be tolerated without seriously affecting the anisotropic nature of the polymer in the melt. It is nevertheless preferable to maximize the amount of cyclohexylene radicals in the *trans* configuration which are present in the polymer. Thus, it is preferred that at least 90 percent (e.g., 95 percent or more) of the cyclohexylene radicals be present in the *trans* configuration.

*Trans*- and *cis*-1,4-cyclohexanedicarboxylic acid can be distinguished from one another by such techniques as NMR and IR spectroscopy, as well as by their melting points. A melting point calibration curve is one means by which the relative amounts of *trans*- and *cis*-1,4-cyclohexanedicarboxylic acid in a mixture of the isomers can be determined.

Although moiety V may be substituted in the same manner as moiety I, highly satisfactory polymers can be formed wherein the carbocyclic dicarboxyl moiety is free of ring substitution.

Moiety V is present in the poly(ester-carbonate) of the present invention in a concentration within the range of approximately 0 to 30 mole percent. Preferably, moiety V is present in a concentration within the range of approximately 0 to 20 mole percent, and more preferably within the range of approximately 0 to 10 mole percent (e.g., approximately 5 to 10 mole percent).

In the poly(ester-carbonate) of the present invention, the molar concentration of moiety II will be substantially equal to the total molar concentration of moieties III and V. This fact will be readily apparent to one skilled in the art. The ester bonding

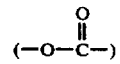

incorporates equal molar quantities of oxy units (provided by moiety II) and carboxyl units (provided by moiety V). The carbonate bonding

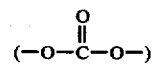

incorporates two moles of oxy units (provided by moiety II) to each mole of carbonyl (i.e., carbonic acid) units (provided by moiety III). Thus, the sum of the molar concentration of moieties III and V must be substantially equal to the molar concentration of moiety II. The moieties derived from hydroxyacids (moieties I and IV) likewise participate in the ester and carbonate bonding.

The various moieties upon polymer formation will tend to be present in a random order.

The substituents, if present, on the rings of the moieties described above are selected from the group consisting of an alkyl group of 1 to 4 carbon atoms, an alkoxy group of 1 to 4 carbon atoms, halogen, phenyl, and mixtures of the foregoing.

The poly(ester-carbonate) of the present invention commonly exhibits

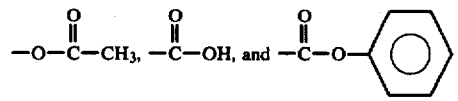

end groups depending upon the synthesis route selected. For instance, if the poly(ester-carbonate) is derived from diphenyl carbonate, end groups such as

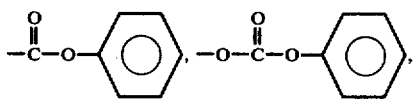

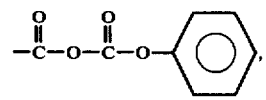

may be present. If the poly(ester-carbonate) is derived from phosgene, end groups such as

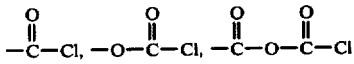

as well as

may be present. As will be apparent to those skilled in the art, the end groups optionally may be capped, e.g., acidic end groups may be capped with a variety of alcohols, and hydroxyl end groups may be capped with a variety of organic acids. For instance, end capping units such as phenyl ester

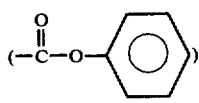

and methyl ester

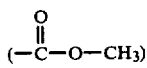

optionally may be included at the end of the polymer chains. The polymer also may be oxidatively cross-linked to at least some degree, if desired, by heating in an oxygen-containing atmosphere (e.g., in air) while in bulk form or as a previously shaped article at a temperature below its melting temperature for a limited period of time (e.g., for a few minutes).

The poly(ester-carbonate) of the present invention commonly exhibits a weight average molecular weight (as prepared) of about 5,000 to about 50,000, and preferably about 10,000 to 30,000, e.g., about 15,000 to 17,500. Such molecular weight may be determined by standard techniques not involving the solutioning of the polymer, e.g., by end group determination via infrared spectroscopy on compression molded films. Alternatively, light scattering techniques may be employed to determine the molecular weight.

The poly(ester-carbonate) of the present invention is capable of undergoing melt processing employing common melt processing techniques, e.g. at a temperature within the range of approximately 200° C. to 400° C. Preferably, the polymer is melt processed at a temperature within the range of approximately 250° C. to 350° C. and more preferably within the range of approximately 270° C. to 330° C.

The melting temperature (Tm) of the poly(ester-carbonate) of the present invention may vary widely with the composition of the poly(ester-carbonate).

The poly(ester-carbonate) prior to heat treatment additionally commonly exhibits an inherent viscosity (i.e., I.V.) of at least approximately 0.5 dl./g., and preferably at least approximately 1.0 dl./g., (e.g., approximately 1.5 to 3.5 dl./g.) when measured at a concentration of 0.1 weight/volume percent in pentafluorophenol at 60° C.

The poly(ester-carbonate) of the present invention commonly may be considered crystalline in the sense that fibers melt extruded therefrom exhibit X-ray diffraction patterns characteristic of polymeric crystalline materials, using Ni filtered CuKα radiation and flat plate cameras. In those embodiments wherein ring substitution is present as previously described or wherein certain aryl diols, such as 2,2-bis[4-hydroxyphenyl]propane, are present, the poly(ester-carbonate) may be substantially less crystalline in the solid phase and exhibit diffraction patterns typical of oriented amorphous fibers. In spite of the crystallinity commonly observed, the poly(ester-carbonate) of the present invention nevertheless may be easily melt processed in all instances.

The poly(ester-carbonate) of the present invention is readily tractable and forms an anisotropic melt phase whereby an atypical degree of order is manifest in the molten polymer. The improved tractability of the present poly(ester-carbonate) is due, at least in part, to the presence of moiety I, i.e., the 6-oxy-2-naphthoyl moiety, in combination with the other recited moieties. It has been observed that the tractability of the polymer is a function of the molar concentration of moiety I in the polymer.

Furthermore, the poly(ester-carbonate) of the present invention exhibits improved thermal stability over the aromatic poly(ester-carbonate) disclosed in the prior art. The improved thermal stability is likewise attributable, at least in part, to the presence of moiety I in combination with the other recited moieties.

The subject poly(ester-carbonate) readily forms liquid crystals in the melt phase. Such anisotropic properties are manifest at a temperature which is amenable for melt-processing to form shaped articles. Such order in the melt may be confirmed by conventional polarized light techniques whereby crossed polarizers are utilized. More specifically, the anisotropic melt phase may conveniently be confirmed by the use of a Leitz polarizing microscope at a magnification of 40X with the sample on a Leitz hot stage and under a nitrogen atmosphere. The polymer melt is optically anisotropic, i.e., it transmits light when examined between crossed polarizers. Light is transmitted when the sample is optically anisotropic even in the static state.

The poly(ester-carbonate) of the present invention may be formed by a variety of techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, carbonate groups, etc.

The organic monomer compounds may be reacted in the absence of a heat-exchange fluid by a melt ester-interchange procedure. They accordingly may be heated initially to form a melt solution of the reactants with the reaction continuing as solid polymer particles are formed and suspended therein. A vacuum may be applied to facilitate removal of volatiles formed during the final stage of the condensation (e.g., acetic acid, phenol, water, carbon dioxide, etc.). Such a technique is disclosed in British Patent Specification No. 1,568,541, which is incorporated herein by reference.

Briefly, the procedure there disclosed involves subjecting the organic monomer compounds to polycondensation under heat either simultaneously or in an appropriate sequence. The reaction is carried out under heat at an appropriate temperature level and, if necessary, in the presence of a suitable catalyst.

The reaction temperature should usually be 180° C. or above, and preferably 200° C. or above, or more preferably 250° C. or above, but, in any case, it should not exceed 350° C. Pressure for the reaction may be at any appropriate level that can expel various by-products such as, for example, carbon dioxide gas, phenol, water, acetic acid, etc., from the reaction system. The reaction may usually be conducted at ambient or a reduced pressure.

The initial stage of the reaction is carried out under ambient pressure and at a relatively low temperature. As the reaction proceeds, the temperature level should preferably be raised, and the pressure reduced.

Examples of the catalysts suitable for use in the reaction are: simple substances such as lithium, sodium, potassium, magnesium, calcium, and so on; or compounds of these simple substances and titanium, manganese, cobalt, zinc, tin, antimony, lanthanum, cerium, lead, and germanium, such as for example oxides, hydrides, hydroxides, halides, alcoholates, phenolates, organic and inorganic acid salts, complex salts, mixed salts, and so forth. More specifically, there can be exemplified sodium metal, sodium hydroxide, lithium acetate, sodium acetate, potassium acetate, calcium benzoate, calcium acetate, magnesium acetate, titanium tetrabutoxide, titanium tetraphenoxide, manganese acetate, cobalt acetate, cobalt chloride, zinc oxide, stannous acetate, stannous benzoate, antimony trioxide, lanthanum hydroxide, cerium carbonate, lead oxide, germanium oxide, titanium trisacetyl acetonate, dibutyl tin diacetate, and so on. Of these compounds, the above-mentioned tin compounds are particularly preferable.

The quantity of the catalyst to be used in carrying out the method of the present invention usually ranges from 0.005 to 1.0 mole percent or preferably from 0.01 to 0.2 mole percent.

The ratio in which the starting materials are charged to the reactor may depend, to some extent, on the mode of the reaction. In general, however, the molar ratio of moieties I, II, IV, and V in the poly(ester-carbonate) is substantially coincident with the ratio in which the respective monomeric compounds are charged to the reactor. On the other hand, the compound or compounds from which moiety III is derived are decomposed during the reaction and tend to be removed from the reaction system by distillation in the form of carbon dioxide gas and other volatiles. It is therefore commonly advisable to introduce such compounds to the reactor in a molar ratio slightly greater (e.g., by a few mole percent) than that which is desired in the final polymer product.

The poly(ester-carbonate) of the present invention can also be produced by a polycondensation reaction using phosgene in place of a diaryl carbonate. In this case, the reaction can be carried out by methods in which the other organic monomer compounds and phosgene are subjected to polycondensation in the presence of an alkaline solution or, alternatively, in the presence of tertiary amine and inert solvent.

Irrespective of the method which is used to form the poly(ester-carbonate), the organic monomer reactants from which the hydroxyacid moieties (i.e., moieties I and IV) and the dioxyaryl moiety (i.e., moiety II) are derived may be initially provided in a modified form whereby the usual hydroxyl groups of these monomers are esterified (i.e., they are provided as acyl esters). For instance, lower acyl esters of 6-hydroxy-2-naphthoic acid, p-hydroxybenzoic acid, and hydroquinone, wherein the hydroxy groups are esterified, may be provided as reactants. The lower acyl groups preferably have from about 2 to about 4 carbon atoms. Preferably, the acetate esters of the organic compounds which form moieties I, II, and IV are provided. Accordingly, particular preferred reactants for the condensation reaction are 6-acetoxy-2-naphthoic acid, p-acetoxybenzoic acid, and hydroquinone diacetate.

The molecular weight of a previously formed poly(ester-carbonate) may be further increased via a solid state polymerization procedure wherein the particulate polymer is heated in a flowing inert gaseous atmosphere (e.g., in a flowing nitrogen atmosphere) at a temperature approximately 20° C. below the melting temperature of the polymer for 10 to 12 hours.

The poly(ester-carbonate) of the present invention readily can be melt-processed to form a variety of shaped articles, e.g., molded three-dimensional articles, fibers, films, tapes, etc. The poly(ester-carbonate) of the present invention is suited for molding applications and may be molded via standard injection molding techniques commonly utilized when forming molded articles. It is not essential that more severe molding conditions (e.g., higher temperature, compression molding, impact molding, or plasma spraying techniques) be utilized. Fibers or films may be melt extruded.

A molding compound may be formed from the poly(ester-carbonate) of the present invention which incorporates approximately 1 to 60 percent by weight of a solid filler (e.g., talc) and/or reinforcing agent (e.g., glass fibers).

The poly(ester-carbonate) also may be employed as a coating material which is applied as a powder or from a liquid dispersion.

When forming fibers and films, the extrusion orifice may be selected from among those commonly utilized during the melt extrusion of such shaped articles. For instance, the shaped extrusion orifice may be in the form of a rectangular slit (i.e., a slit die) when forming a polymeric film. When forming a filamentary material, the spinneret selected may contain one and preferably a plurality of extrusion orifices. For instance, a standard conical spinneret, such as those commonly used in the melt spinning of polyethylene terephthalate, containing 1 to 2000 holes (e.g., 6 to 1500 holes) having a diameter of about 1 to 60 mils (e.g., 5 to 40 mils) may be utilized. Yarns of about 20 to 200 continuous filaments are commonly formed. The melt-spinnable poly(ester-carbonate) is supplied to the extrusion orifice at a temperature above its melting temperature, e.g., a temperature of about 270° C. to 330° C. in preferred embodiments.

Subsequent to extrusion through the shaped orifice, the resulting filamentary material or film is passed in the direction of its length through a solidification or quench zone wherein the molten filamentary material or film is transformed into a solid filamentary material or film. The resulting fibers commonly have a denier per filament of about 1 to 25, and preferably a denier per filament of about 2 to 10.

The resulting filamentary material or film optionally may be subjected to a thermal treatment whereby its physical properties are further enhanced. The tenacity of the fiber or film generally is increased by such thermal treatment. More specifically, the fibers or films preferably may be thermally treated in an inert atmosphere (e.g., nitrogen, argon, helium) or alternatively in a flowing oxygen-containing atmosphere (e.g., air) with or without stress at a temperature below the polymer melting temperature until the desired property enhancement is achieved. Thermal treatment times commonly range from a few minutes to several days. Generally, as the product is thermally treated, its melting temperature progressively is raised. The temperature of the atmosphere may be staged or continuously increased during the thermal treatment or held at a constant level. For instance, the product may be heated initially at 240° C. for several hours, and the temperature thereafter progressively raised. Alternatively, the product may be heated at about 10° C. to 20° C. below the temperature at which it melts for about 45 hours. Optimal heat treatment conditions will vary with the specific composition of the poly(ester-carbonate) and with the process history of the product.

The as-spun fibers formed from the poly(ester-carbonate) of the present invention are fully oriented and exhibit highly satisfactory physical properties which render them suitable for use in high performance applications. The as-spun fibers commonly exhibit an average single filament tenacity of at least 2 grams per denier (e.g., about 2 to 12 or more grams per denier) and an average single filament tensile modulus of at least about 200 grams per denier (e.g., about 200 to 600 grams per denier).

Such properties enable the fibers to be used with particular advantage as tire cords and in other industrial applications, such as conveyor belts, hose, rope, cabling, resin reinforcement, etc. Films formed of the poly(ester-carbonate) of the present invention may be used as strapping tape, cable wrap, magnetic tape, electric motor dielectric film, etc. The fibers and films exhibit an inherent resistance to burning.

The poly(ester-carbonate) of the present invention exhibits a unique combination of highly advantageous properties generally not provided by poly(ester-carbonate) of the prior art. Such properties include excellent tractability, the ability to form an anisotropic melt phase, and improved thermal stability (i.e., a diminished tendency to decompose at high temperatures). This unique combination of properties appears to be attributable to the inclusion of the 6-oxy-2-naphthoyl moiety in combination with the other recited moieties.

The following Example is presented as a specific illustration of the claimed invention. It should be understood, however, that the invention is not limited to the specific details set forth in the Example.

EXAMPLE

This Example illustrates the preparation of a poly(ester-carbonate) from 6-hydroxy-2-naphthoic acid, hydroquinone, and carbonic acid (or derivatives thereof) in the molar ratio 54:23:23.

A 300 ml. 3-necked flask was fitted with a sealed glass paddle stirrer, an inert gas inlet, a still head, and a water condenser through which hot water at about 60° C. was passed. A graduated receiver flask and adaptor were fitted to the condenser.

Into the flask were charged 65.8 g. (0.35 mole) of 6-hydroxy-2-naphthoic acid, 16.5 g. (0.15 mole) of hydroquinone, and 112.4 g. (0.525 mole) of diphenylcarbonate. Dibutyl tin diacetate (0.02 g.) was added as a catalyst.

The flask was heated in an oil bath to 250° C., and the molten contents were stirred while under an argon atmosphere. The melt was clear and dark brown. Phenol began to distill over rapidly, and, due to the hot water condenser, it remained liquid until it collected in the receiver. Any solid which formed was melted down with a hot air gun. After one hour at 250° C., 60.0 ml. of phenol (65% of the theoretical yield) had distilled over, and the distillation rate had fallen nearly to zero. The bath was then raised to 280° C. The melt at this point was cloudy and opaque. Heating continued for a further 70 minutes at 280° C., by which time 83.0 ml. of phenol (88% of the theoretical yield) had distilled. The melt was opaque and tan-colored. Vacuum (0.5 mm.) was applied slowly to minimize foaming. The melt was stirred and heated under vacuum at 280° C. for a total of 90 minutes. Initially, there was much bubbling and foaming, but gradually the melt became quiescent and much more viscous so that it balled up around the stirrer shaft. At this point the vacuum was released with inert gas, and the flask was removed from the oil bath. Long, strong, stiff fibers could be pulled from the melt.

The tan-colored polymer was removed when cold by breaking the flask. The lump of polymer was freed from chips of glass, ground in a Wiley mill, and extracted for two hours in a Soxhlet apparatus with acetone to remove low molecular weight impurities.

When measured by differential scanning calorimetry (DSC), the polymer exhibited a $T_g$ inflection at 100° C. and a sharp $T_m$ endotherm at 253° C. The polymer exhibited an inherent viscosity (I.V.) of 1.74 dl./g. when measured at a concentration of 0.1 weight/volume percent in pentafluorophenol at 60°.

The dried polymer powder was melt spun through a 0.007 inch single hole spinneret at 330° C. at a throughput of 0.42 g./min. and a take-up speed of 129 m./min. The following single filament properties were exhibited:

| Tenacity | 3.7 g./d. |
| Elongation | 2.0% |
| Initial modulus | 270 g./d. |
| Denier | 29.4 |

A powdered mixture of the polymer as a KBr disk was examined by Fourier-Tranform Infrared Spectroscopy. An aromatic ester peak at 1730 cm.$^{-1}$ and an aromatic carbonate peak at 1780 cm.$^{-1}$ were both present. From a calibration of peak intensities, it was determined that the concentration of ester units to carbonate units was in the molar ratio of 52:22, as compared with the calculated ratio of 54:23.

Although the invention has been described with a preferred embodiment, it is to be understood that variations and modifications may be employed without departing from the concept of the invention as defined in the following claims.

We claim:

1. A melt-processable poly(ester-carbonate) capable of forming an anisotropic melt phase at a temperature below approximately 400° C. consisting essentially of recurring moieties I, II, III, and, optionally, IV and V wherein:

I is

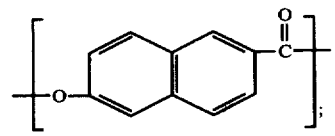

II is O—Ar—O, where Ar is a divalent radical comprising at least one aromatic ring;

III is

IV is

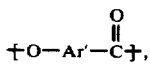

where Ar' is a divalent radical comprising at least one aromatic ring, other than 2,6-naphthylene; and V is

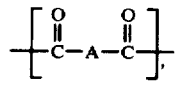

where A is a divalent carbocyclic radical, wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein moiety I is present in the polymer in a concentration of at lesast approximately 20 mole percent, moiety IV is present in the polymer in a concentration within the range of approximately 0 to 60 mole percent, with the total molar concentration of moieties I and IV in the polymer being within the range of approximately 20 to 80 mole percent, moiety II is present in the polymer in a concentration within the range of approximately 10 to 40 mole percent, moiety III is present in the polymer in a concentration within the range of approximately 10 to 40 mole percent, and moiety V is present in the polymer in a concentration within the range of approximately 0 to 30 mole percent, with the molar concentration of moiety II being substantially equal to the sum of the molar concentrations of moieties III and V.

2. The melt-processable poly(ester-carbonate) of claim 1 which is capable of forming an anisotropic melt phase at a temperature below approximately 350° C.

3. The melt-processable poly(ester-carbonate) of claim 1 which exhibits an inherent viscosity of at least approximately 0.5 dl./g. when measured at a concentration of 0.1 weight/volume percent in pentafluorophenol at 60° C.

4. The melt-processable poly(ester-carbonate) of claim 1 wherein moiety I is present in a concentration within the range of approximately 20 to 70 mole percent.

5. The melt-processable poly(ester-carbonate) of claim 1 wherein moiety II is present in a concentration within the range of approximately 15 to 35 mole percent.

6. The melt-processable poly(ester-carbonate) of claim 1 wherein moiety III is derived from a diaryl carbonate.

7. The melt-processable poly(ester-carbonate) of claim 6 wherein moiety III is derived from diphenyl carbonate.

8. The melt-processable poly(ester-carbonate) of claim 1 wherein moiety III is present in a concentration within the range of approximately 15 to 35 mole percent.

9. The melt-processable poly(ester-carbonate) of claim 1 wherein IV is present in a concentration within the range of approximately 0 to 30 mole percent.

10. The melt-processable poly(ester-carbonate) of claim 1 wherein moiety V is derived from a member of the group consisting of terephthalic acid, isophthalic acid, 2,6-naphthalenedicarboxylic acid, trans-1,4-cyclohexanedicarboxylic acid, and mixtures thereof.

11. The melt-processable poly(ester-carbonate) of claim 1 wherein moiety V is present in a concentration within the range of approximately 0 to 20 mole percent.

12. A molding compound comprising the melt-processable poly(ester-carbonate) of claim 1 which incorporates approximately 1 to 60 percent by weight of a solid filler and/or reinforcing agent.

13. A molded article comprising the melt-processable poly(ester-carbonate) of claim 1.

14. A fiber which has been melt spun from the melt-processable poly(ester-carbonate) of claim 1.

15. A film which has been melt extruded from the melt-processable poly(ester-carbonate) of claim 1.

16. A melt-processable poly(ester-carbonate) capable of forming an anisotropic melt phase at a temperature below approximately 400° C., consisting essentially of recurring moieties I, II, III, and optionally, IV and V wherein:

I is

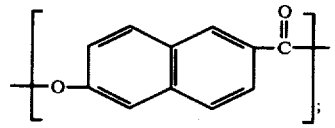

II is O—Ar—O, where Ar is a divalent radical comprising at least one aromatic ring;

III is

IV is

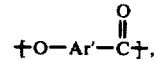

where Ar' is a divalent radical comprising at least one aromatic ring, other than 2,6-naphthylene; and V is

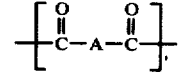

where A is a divalent carbocyclic radical, wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein moiety I is present in the polymer in a concentration within the range of approximately 20 to 70 mole percent, moiety IV is present in the polymer in a concentration within the range of approximately 0 to 30 mole percent, with the total molar concentration of moieties I and IV in the polymer being within the range of approximately 20 to 70 mole percent, moiety II is present in the polymer in a concentration within the range of approximately 15 to 35 mole percent, moiety III is present in the polymer in a concentration within the range of approximately 15 to 35 mole percent, and moiety V is present in the polymer in a concentration within the range of approximately 0 to 20 mole percent, with the molar concentration of moiety II being substantially equal to the total molar concentration of moieties III and V.

17. The melt-processable poly(ester-carbonate) of claim 16 which is capable of forming an anisotropic melt phase at a temperature below approximately 350° C.

18. The melt-processable poly(ester-carbonate) of claim 16 which exhibits an inherent viscosity of at least approximately 0.5 dl./g. when measured at a concentration of 0.1 weight/volume percent in pentafluorophenol at 60° C.

19. The melt-processable poly(ester-carbonate) of claim 16 wherein moiety I is present in a concentration within the range of approximately 30 to 60 mole percent.

20. The melt-processable poly(ester-carbonate) of claim 16 wherein moiety II is a p-dioxyphenyl moiety.

21. The melt-processable poly(ester-carbonate) of claim 16 wherein moiety II is present in a concentration within the range of approximately 20 to 30 mole percent.

22. The melt-processable poly(ester-carbonate) of claim 16 wherein moiety III is derived from a diaryl carbonate.

23. The melt-processable poly(ester-carbonate) of claim 22 wherein moiety III is derived from diphenyl carbonate.

24. The melt-processable poly(ester-carbonate) of claim 1 wherein moiety III is present in a concentration within the range of approximately 20 to 30 mole percent.

25. The melt-processable poly(ester-carbonate) of claim 16 wherein moiety IV is a p-oxybenzoyl moiety.

26. The melt-processable poly(ester-carbonate) of claim 16 wherein moiety V is derived from a member of the group consisting of terephthalic acid, isophthalic acid, 2,6-naphthalenedicarboxylic acid, trans-1,4-cyclohexanedicarboxylic acid, and mixtures thereof.

27. The melt-processable poly(ester-carbonate) of claim 16 wherein moiety V is present in a concentration within the range of approximately 0 to 10 mole percent.

28. A molding compound comprising the melt-processable poly(ester-carbonate) of claim 16 which incorporates approximately 1 to 60 percent by weight of a solid filler and/or reinforcing agent.

29. A molded article comprising the melt-processable poly(ester-carbonate) of claim 16.

30. A fiber which has been melt spun from the melt-processable poly(ester-carbonate) of claim 16.

31. A film which has been melt extruded from the melt-processable poly(ester-carbonate) of claim 16.

32. A melt-processable poly(ester-carbonate) capable of forming an anisotropic melt phase at a temperature below approximately 400° C. consisting essentially of recurring moieties I, II, III, and, optionally, IV and V wherein:

I is

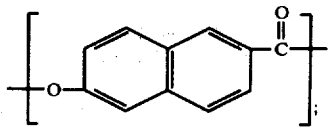

II is

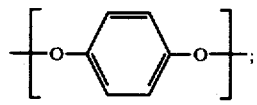

III is

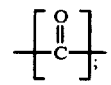

IV is

and

V is

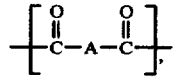

where A is a divalent carbocyclic radical, wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein moiety I is present in the polymer in a concentration within the range of approximately 20 to 70 mole percent, moiety IV is present in the polymer in a concentration within the range of approximately 0 to 30 mole percent, with the total molar concentration of moieties I and IV in the polymer being within the range of approximately 20 to 70 mole percent, moiety II is present in the polymer in a concentration within the range of approximately 20 to 30 mole percent, moiety III is present in the polymer in a concentration within the range of approximately 20 to 30 mole percent, and moiety V is present in the polymer in a concentration within the range of approximately 0 to 10 mole percent, with the molar concentration of moiety II being substantially equal to the total molar concentration of moieties III and V.

33. The melt-processable poly(ester-carbonate) of claim 32 which is capable of forming an anisotropic melt phase at a temperature below approximately 350° C.

34. The melt-processable poly(ester-carbonate) of claim 32 which exhibits an inherent viscosity of at least approximately 0.5 dl./g. when measured at a concentration of 0.1 weight/volume percent in pentafluorophenol at 60° C.

35. The melt-processable poly(ester-carbonate) of claim 32 wherein moiety III is derived from a diaryl carbonate.

36. The melt-processable poly(ester-carbonate) of claim 35 wherein moiety III is derived from diphenyl carbonate.

37. The melt-processable poly(ester-carbonate) of claim 32 wherein moiety IV is present in a concentration within the range of approximately 5 to 30 mole percent.

38. The melt-processable poly(ester-carbonate) of claim 32 wherein moiety V is derived from a member of the group consisting of terephthalic acid, isophthalic acid, 2,6-naphthalenedicarboxylic acid, trans-1,4-cyclohexanedicarboxylic acid, and mixtures thereof.

39. The melt-processable poly(ester-carbonate) of claim 32 wherein moiety V is present in a concentration within the range of approximately 5 to 10 mole percent.

40. A molding compound comprising the melt-processable poly(ester-carbonate) of claim 32 which incorporates approximately 1 to 60 percent by weight of a solid filler and/or reinforcing agent.

41. A molded article comprising the melt-processable poly(ester-carbonate) of claim 32.

42. A fiber which has been melt spun from the melt-processable poly(ester-carbonate) of claim 32.

43. A film which has been melt extruded from the melt-processable poly(ester-carbonate) of claim 32.

* * * * *